Aug. 23, 1932. A. FRIED 1,873,571

FOCUSING DEVICE FOR MOTION PICTURE CAMERAS

Filed April 20, 1931 2 Sheets-Sheet 1

INVENTOR:
ARMIN FRIED,
By: his Atty.

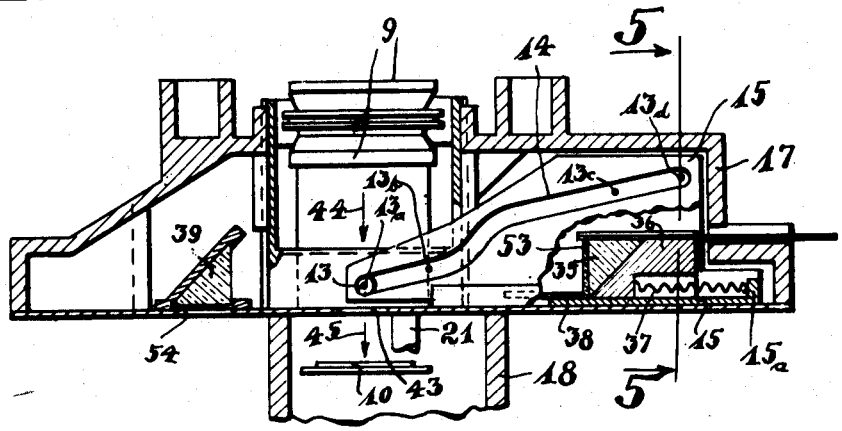
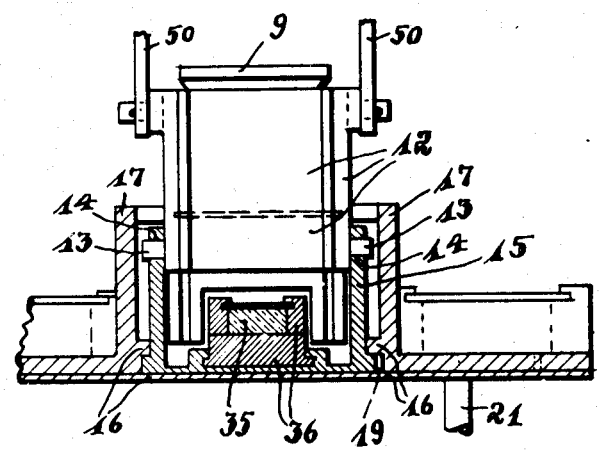
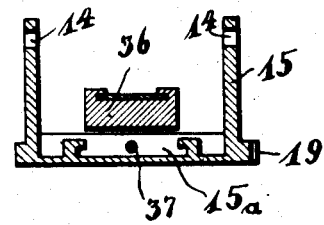
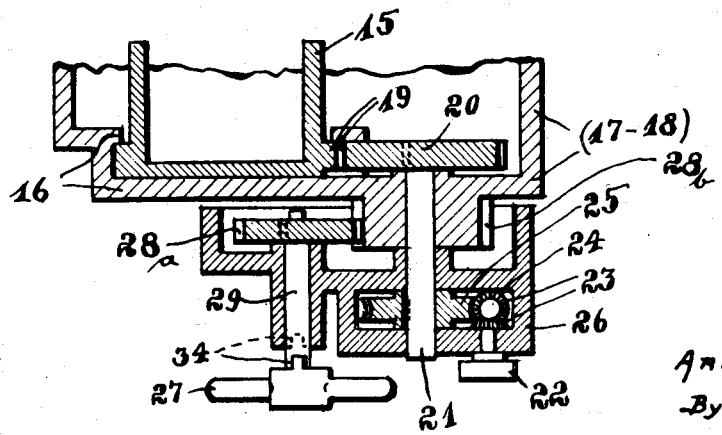

Patented Aug. 23, 1932

1,873,571

UNITED STATES PATENT OFFICE

ARMIN FRIED, OF LOS ANGELES, CALIFORNIA

FOCUSING DEVICE FOR MOTION PICTURE CAMERAS

Application filed April 20, 1931. Serial No. 531,372.

This invention relates to motion picture cameras and appliances whereby the camera can be focused quickly and accurately.

One of the objects of this invention is to provide appliances whereby the camera can be focused to a point of action with the action or performance at various distances from the camera, and whereby such a change of focus can be made with ease and accuracy.

Another object is to provide means whereby the actual photographic image is reflected from a ground glass to the finder.

Another object is to provide a focusing dial with calibrations to indicate the distance of the action or performance from the camera in footage or other suitable terms distance.

Another object is to provide a dial graduated or calibrated for two or more lenses.

Another object is to provide such appliances operative and visible from the rear side of the camera.

Another object is to provide means whereby the camera can be focused while filter holders, mat holders, so-called bags or blimps for silencing purposes are and remain in operative position on sound-motion-picture cameras.

Another object is to provide means whereby the lens can be moved in a straight or linial, or axial direction and manner.

Another object is to provide means whereby attachments for sunshades, mats, filters and other sound devices or sound eliminating devices can be carried by and moved together with such a linially moving lens.

Other objects will appear from the following description and appended claims as well as from the accompanying drawings, in which—

Fig. 3 is a fragmentary horizontal view of a lens, with supporting parts in horizontal section and partly in top plane view, and with operating mechanism shifted for holding the lens in operative alignment with the film in the camera.

Fig. 4 is a cross section on line 4—4 of Fig. 1, being the position in which the prisms are in operative relation or alignment with the finder, the main lens being shifted to its outermost position and being shown with its holder in side elevation roughly outlined.

Fig. 5 is a cross section on line 5—5 of Fig. 3, through the lens-and prism-shifting carriage, illustrating the yieldable mounting of the prism-support within the lens-shifting carriage.

Fig. 6 is a fragmentary somewhat diagrammatic illustration of the quick-changing parts with respect to the quick-changing focus operations, the parts being not exactly in the form or proportions shown in the other illustrations.

Figure 1:
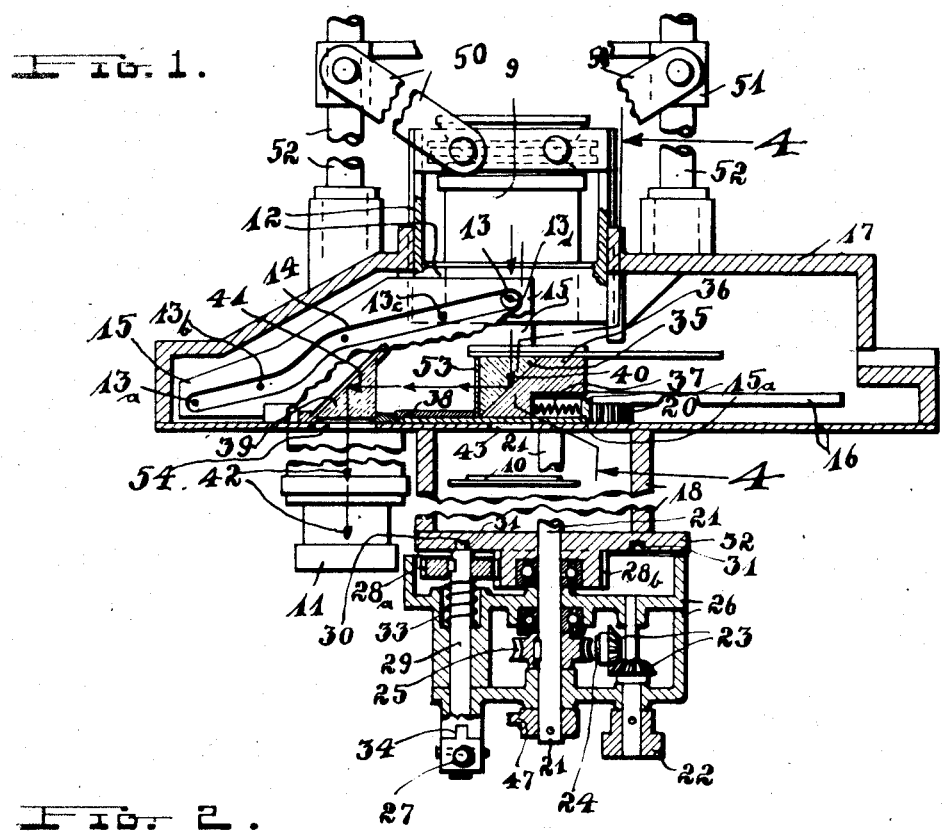
Fig. 1 is a general horizontal section through a camera, in a rough and fragmentary outline, having focusing mechanisms mounted therein in operative alignment with the finder.

In the art of photography especially with respect to motion pictures, speed and accuracy in focusing lenses, more particularly, while an object is moving or being moved to or from the camera, a changing of the focus, so-called "follow-focus" is of greatest importance.

Moreover, since the introduction of sound-motion-pictures, a great variety or number of different appliances, to a large extent on or around the lens of the camera, make it very difficult to adjust or operate the common lens or camera in a suitably efficient manner.

As illustrated in the drawings, with the camera and the several appliances disclosed herewith, a cameraman does not require any helper for quick or odd adjustments, and the cameraman himself can at all times be and remain behind the camera and in a position to most favorably observe all actions and performances to be recorded by the camera.

A distinct mechanism is provided to focus the main lens 9 correspondingly or equally to a sensitized surface 10 or for observation through the finder 11 while the main lens 9 with its focal axis remains in the focal direction of the object.

The main lens 9 is for this reason removably and exchangeably mounted on a special shiftable holder 12, whereby the lens 9 can be brought to its outermost position in which it is illustrated in Figs. 1 and 4, being the focusing position with respect to the finder 11, or to its innermost position in which it is illustrated in Fig. 3, being the focusing position with respect to the sensitized surface 10.

The holder 12 is provided with pins 13 on the opposite sides, shiftable within the slots 14 in the shifting carriage 15. The carriage 15, in turn, is shiftable in the guides 16 of the box or head-structure 17 applied to the front end of the camera 18, which may be of any well known type or design, or may be of a specially designed form, as far as this invention is concerned.

Figure 2:
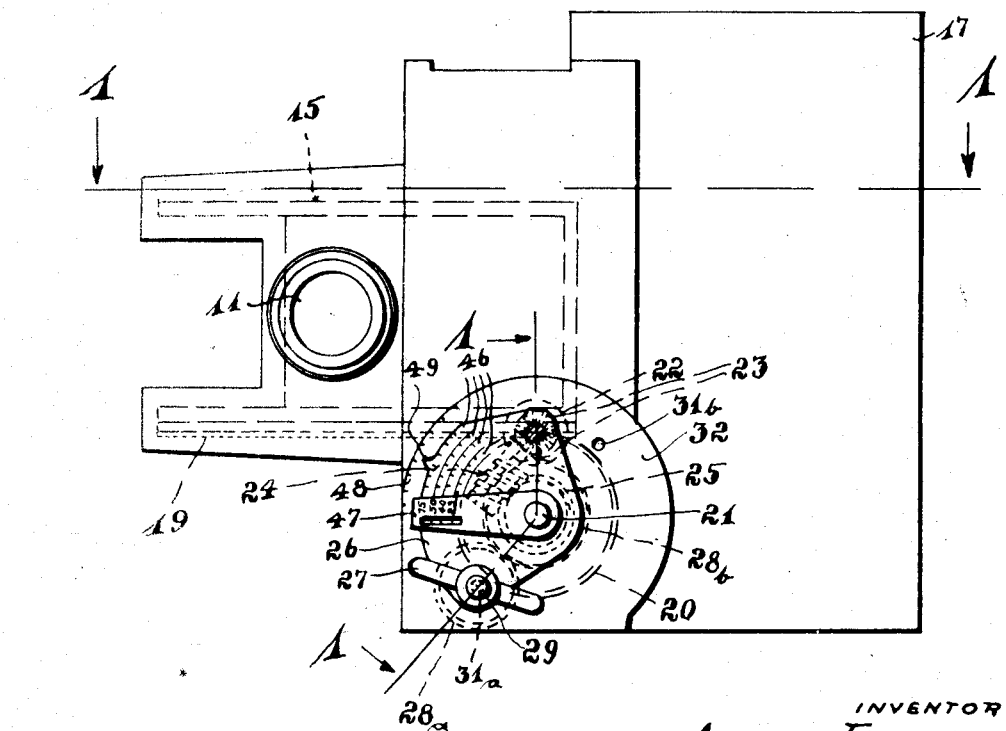
Fig. 2 is a front elevation of the focusing mechanism on the rear side of the camera, being in this case understood as the operator's end or side of the camera.

A gear-rack 19 on the carriage 15, see Figs. 4 and 2 is provided to be operatively engaged by the gear 20, which may be turned or rotated by means of the shaft 21, see also Fig. 1.

For shifting the carriage 15 and thereby adjusting the main lens 9, a special mechanism is provided on the rear side of the camera, illustrated in Figs. 1 and 2.

The focus-adjusting knob 22 is operatively engaged to the shaft 21 by means of the bevel gears 23, the worm 24, and the worm-gear 25, so that, by a turning of the knob 22, the shaft 21 and therewith the gear 20 are turned, to result in a shifting of the carriage 15 between the points indicated at $13_a$ and $13_b$ with respect to a direct projection of the lens upon the sensitized surface 10, on the one side, and between the points $13_c$ and $13_d$ with respect to the lens-finder position.

Under this arrangement, whenever a focus has been established at the point $13_d$ with respect to the finder, this focusing adjustment by means of the knob 22 is automatically also correct for a focusing with respect to the sensitized surface 10 at the point $13_b$ of the carriage.

In order to utilize this focal adjustment by means of the knob 22, with respect to the finder, for the purpose of focusing the lens 9 with respect to the sensitized surface 10, a quick adjustment is also provided in operative connection with this focal adjustment.

It will be understood that the worm and worm-gear engagement between the knob 22 and shaft 21 practically locks the shaft 21 to the position to which it has been adjusted by means of the knob, and, since the several parts of the focal adjustment are mounted within a common frame 26 which is turnable or swingable around the shaft 21, a change-lever 27 serves to swing the whole frame 26 with the enclosed gears 23 and worm as well as worm-gear from finding position to photographing position by means of the gears 28 under and in any focal adjustment previously established, the gear $28_b$ being stationary with the camera, while the gear $28_a$ travels around the gear $28_b$ merely in form of leverage being in firm operative engagement with the handle 27, handle 27 and gear $28_a$ being swingable with the frame 26.

For holding the whole frame 26 and enclosed focal-adjustment in either the finding or photographing position, the handle 27 is mounted on an axially shiftable pin 29 of which the end 30 engages in certain recesses in the front plate 32 of the camera, the recess $31_a$ serving for the predetermined position for the pin 29 for a setting in the finder-focusing positions, while the recess $31_b$ serves to hold the pin 29 in the predetermined position for the photographing-focus and the various adjustments therefor.

The pin 29 and therewith the handle 27 is held in its innermost engaging position under the tension of the spring 33, and, in order to prevent a turning of the handle with the gear $28_a$ around the gear $28_b$, whereby the pin-end 30 might easily be shorn off, a notch-engagement 34 is provided between the handle 27 and the frame 26.

Inasmuch as the image must appear equally well focused through the finder while the carriage 15 is being moved between the points $13_c$ and $13_d$ the intermediate prism 35 is mounted to remain stationary during the adjustments with the finder.

Considering the position of the cross-piece $15_a$ of the carriage 15 in the illustration of Fig. 3, with respect to the prism-holder 36, and with the spring 37 fully expanded, and comparing this with the position of the same cross-piece $15_a$ in the illustration of Fig. 1, with the spring 37 fully compressed, it must be evident that the prism-holder 36 with the prism 35 stopped moving when it reached its above-referred to stationary position while the carriage 15 was still able to move further for the focal adjustments between the points $13_c$ and $13_d$.

In fact, the prism-holder 36 with the intermediate prism 35 stops moving when the carriage 15 reaches the position that the pins 13 are at the points $13_c$ in the slots 14 in the opposite side members of the carriage 15.

Any sort of a stop in the box or head-structure 17 can be provided in the path of the moving prism-holder and any stop that may be provided by any mechanic would be sufficient though in the drawing an extension-end 38 has been indicated as projecting forward from the movable prism-holder to abut against the frame or holder of the finder-prism 39.

When the movable or intermediate prism 35 has reached its stationary position, a focusing relation has been established in the direction of the arrows 40, 41, and 42 between the main lens 9 and the finder 11, the photographing aperture 43 in the front-end of the camera being shut off under these conditions as will be clear from the illustration in Fig. 1.

The change of focus to be obtained by a shifting or adjustment of the carriage to bring the pins 13 of the main lens-support from point $13_c$ to point $13_d$ should be understood to be the possible focal range of a lens.

Disengaging the notch-engagement at 34, the pin-end 30 is lifted from the recess 31a and the whole frame with the enclosed adjustment is free to swing around the shaft 21, and, by a turning of the pin 29 by means of the handle 27, the gear $28_a$ is rolled over the gear $28_b$, thereby furnishing a suitable leverage to the operator on the frame 26, in order to turn the frame 26 with the interlocked adjustment and with the shaft 21, to result in a turning of the gear 20, which in turn results in a shifting, or, as stated above, in a quick change from the finder-focusing position to the photographing-focusing position.

Having through the finder and the focusing thereof in the direction 40—41—42 eventually adjusted the main-lens to the position $13_d$, the quick-change by the handle 27 brings the carriage 15, with the intermediate prism 35 removed from above the photographing aperture 43, shifted for focusing position of the main lens 9 in relation to the sensitized surface 10 in the straight direction indicated by the arrows 44 and 45, as illustrated in Fig. 3, the pins 13 of the lens-support 12, however, being then in the position indicated at $13_b$.

From the above it will be clear that any focal adjustment established through the finder, with the main-lens held by the pins 13 at any point between the points $13_c$ and $13_d$, can quickly be changed to proper corresponding focusing position with respect to the sensitized surface in the camera 18 by means of this quick changing handle operation; and, on the other hand, when, on a free observation, the operator believes that through a quick movement or unexpected greater movement of the actors or performers the camera might be out of focus, he can quickly move back and forth between finding and photographing focusing positions.

The somewhat diagrammatic illustration in Fig. 6, in which the same numerals have been used though the respective parts are not at all of corresponding form or proportion as in the other illustrations, may help to make this better understood, since here it must be clear that the shaft 21 is firmly locked to the frame 26 by the worm and worm-gear engagement mounted therein, and the carriage-shifting gear 20 is rotated by any rotation of the frame 26 around the axis of the shaft 21, the handle 27 merely serving to facilitate such a rotation of the frame by the leverage provided by means of the gear-engagement 28 and the secondary lever between the pin 29 and the shaft 21, or more correctly the lever formed by the frame between the axis of the pin 29 and the axis of the shaft 21.

Though it has been stated above that the handle operation is for the quick change between finder—and photographing—focusing positions, which it principally is, the handle can nevertheless also be used for quick but sudden shorter movements, especially while the carriage is in the position illustrated in Fig. 3.

It has also been stated above that the adjustments between the points $13_a$ and $13_b$, for the finder, and between the points $13_c$ and $13_d$, for the protographing, practically cover the whole range of a lens, so that any adjustments between these points can focus the camera to any action or performance within the range of the lens.

Inasmuch as actions and performances in the motion picture industry include comparatively varying changes with respect to positions and quickness in which such positions are taken, and inasmuch as such changes of positions and thereby of the focusing are practically always or at least largely predetermined, a quick setting of the camera for such varying focusing is essential.

Moreover, inasmuch as the different focal distances for any given lens are well enough known or can easily be ascertained, and a lens can easily be set or adjusted along or in suitable relation to a suitably calibrated scale, such calibrations or graduations are provided on this device, so that by a quick turning of the handle to a short distance the camera can be quickly changed to different focuses.

On the other hand, it may also be considered that hardly two lenses focus alike, especially lenses of different sizes, as, for instance, so-called 25, 40, 50, and 75 millimeter lenses.

The front adjustment is therefore, in the first place, provided with calibrated scales for the different lenses (25, 40, 50, 75, or any other commonly used size or type) with respect to the adjustment knob 22, to assure a correct and proper setting or adjustment for the different lenses by means of the adjusting knob 22, which is most generally intended for such adjustments as stated above, these scales being indicated at 46 in Fig. 2, and readable with respect to the movements of the indicator-arm 47, which is operated by the adjustments made by the knob 22.

When the camera has been adjusted for any given lens according to the scales 46, the adjustment-frame 26 under such adjusted condition can furthermore be adjusted quickly by the handle 27 according to the scale 48, the indicating pointer 49 on the swingable frame 26 pointing towards this scale 48, and the graduations in this scale can easily be marked to mean a certain number of feet or any other term of distance, or, in other words, a quick change from point of action to another within the focal range of the lens as this lens has been adjusted previously by the adjustment knob 22.

For such quick changes there can, of course, not very well be any recesses similar to the recesses 31a and 31b for the pin-end 30, since the pin-end would naturally move only very short distances at times, and the operator would have to hold the handle 27 firmly and watch his pointer positions with respect to the markings commonly made on the motion picture set. It must be understood that such markings are commonly made on or around the ground or outside framework of a motion picture set up which do not appear on the finished picture though they may be closely to the positions taken by the performers and easily observable by the cameraman and by which he knows the exact focus of any performance before him.

The main lens 9 moving in a straight linial or axial direction as set forth above, it will be understood that any such appliances as mats, sunshades, filter-holders, or any other devices necessitated by the introduction of sound-photography, can easily be moved together with the main lens 9 by suitable attachments or connections to the lens-support 12, links 50 having been indicated in the drawing in Fig. 1 as connected to the lens-support 12 by which the attachments 51 can be shifted on the supports 52 that are provided on the box or head structure 17 of this device, but it must be understood that any other attachments commonly in use with modern motion picture and sound devices that allow or require such movements may as well be connected to the lens-support 12 by any suitable means necessitated or required in each case, and it must be understood that I therefore do not limit myself to the particular details shown in the drawing but may use minor details of slightly modified forms within the scope of this invention.

With respect to the finder adjustments and finder focusing operations it may also be pointed out that a ground glass 53 is provided on the side of the movable or intermediate prism 35 whereby a photographic image can be reflected to the finder, such an image being fixed or formed by placing the ground glass in this position in relation to the prism 35, and the image being in this manner reflected to the finder when the carriage is in the position illustrated in Fig. 1, with the main-lens 9 by means of the lens-support 12 moved to the outermost position and adjustable and controllable between the points 13c and 13d, the image being reflected through the aperture 54 to the finder.

Having specifically described every detail and its particular function as well as various cooperative functions of details with one another in the structure as a whole, the following may serve to bring out more broadly the principal operations to be made and to be accomplished with this camera by the various parts.

In this, the main lens 9 serves also for the front lens in the finder 11.

However, all lenses commonly used in the motion picture industry are encased in a form ready to be applied to any camera, and such a case or casing is unfortunately designed so that its innermost end extends into a camera to leave little or practically no space between this end and the sensitized surface with which the lens is supposed to cooperate, considering that a shutter mechanism is normally provided to operate in this space, making it difficult that any prism could be interposed to cooperate between such a main lens and the finder.

The principal movement of this invention rests therefore in the axial shifting of the main lens by means of the moving of the carriage 15 towards one side for a focusing position of the main lens with respect to the sensitized surface, in the first place, and a moving of the carriage towards the opposite side for a focusing position of the same main lens with respect to the finder, in the second place.

In the first place, the main lens is shifted axially to its innermost position with respect to the camera, in which position it is illustrated in Fig. 3, with the intermediate prism 35 moved out of focal alignment.

In the second place, the main lens is shifted axially to its outermost position with the intermediate prism 35 in focal alignment between the main lens 9 and the finder 11, which position is illustrated in Fig. 1, the main lens being in this case out of focus as far as the sensitized surface 10 is concerned, the prism 35, moreover, being in this position interposed between the main lens 9 and the sensitized surface.

This, however, gives the advantage, that no film or sensitized surface is being exposed while the camera is being adjusted to focus by means of the finder, and by means of the slanting slots 14 as described above more specifically and in detail with respect to the fine screw adjustment by means of the turning knob 22.

After having thus been properly adjusted to focus through the finder, the whole front-housing 26 with the thereby enclosed adjusted and so locked screw-adjustment is thrown over by means of the large handle 27 and the pinion-20- and rack-19-engagement, whereby the carriage is shifted sidewise, to bring the main lens from the finder-focusing-position to the photographing-focusing-position, as described specifically and in detail.

Having thus described my invention, I claim:

1. In a camera, a photographing lens, a finder including said lens as a part of its structure, the camera having the customary movable medium with a sensitized surface, and a carriage including reflecting means for the finder movable transversely to the axis of the finder and of the lens and having means for moving the lens outwardly in linear direction coaxial to the axis of the lens when used for focusing with the finder.

2. In a camera, a photographing lens, the camera having the customary movable medium with a sensitized surface in direct photographic alignment with the axis of the lens, a finder sidewise of the photographic focusing axis, and a carriage including an intermediate prism for reflecting an image by way of the lens to the finder when the carriage is moved in one direction and having also means for shifting the lens axially for focusing the lens with respect to the sensitized surface as well as with respect to the finder, the focal alignment between said lens and said sensitized surface being established by a movement of said carriage opposite to said first-named direction.

3. In a camera, a photographing lens, the camera having the customary movable medium with a sensitized surface in direct photographic alignment with the axis of the lens, a finder with its axis sidewise of the lens axis, a carriage movable transversely to said axes and operatively engaged with said lens for axially throwing the lens into focal alignment with the finder when the carriage is moved in one direction and into direct alignment with said sensitized surface when the carriage is moved in the opposite direction, a prism in operative alignment with the said finder, and another prism carried by said carriage and adapted to bring the lens into focal alignment with the finder through said first-named prism by a shifting of the carriage.

4. In a camera, a photographing lens, the camera having the customary movable medium with a sensitized surface in direct photographic alignment with the lens, a finder with its axis sidewise of the focusing axis of the lens, a carriage movable transversely to said axes and having means for adjustably holding the lens in the various positions within the focal range of the lens with respect to the said finder, means for adjusting the lens by the carriage within the said focal range, and other means for changing the focal alignment of the lens with respect to said surface and finder.

5. In a camera, a photographing lens, the camera having the customary movable medium with a sensitized surface in direct photographic alignment with the lens, a finder with its axis sidewise of the focusing axis of the lens, a carriage movable transversely to said axes and having means for adjustably holding the lens in the various positions within the focal range of the lens with respect to the said sensitized surface as well as with respect to the said finder, means for adjusting the lens by the carriage within the said focal range, and other means for changing the focal alignment of the lens in focused condition between the said surface and finder.

6. In a camera, a photographing lens, the camera having the customary movable medium with a sensitized surface in direct photographic alignment with the axis of the lens, a finder with its axis sidewise of the focusing axis of the lens, a carriage movable transversely to said axes and having means for holding the lens focused with respect to said surface and said finder when the carriage is moved sidewise in opposite directions, a prism in operative alignment with said finder and interposed between said lens and said surface when the carriage is moved to focal alignment with said finder, another prism carried by said carriage, and a ground glass in operative relation to said second-named prism and adapted to reflect an actual photographic image to the finder.

7. In a camera, a photographing lens, the camera having the customary movable medium with a sensitized surface in direct photographic alignment with the lens, a finder with its axis sidewise of the focusing axis of the lens, a carriage movable transversely to said axes and having means for adjustably holding the lens in the various positions within the focal range of the lens with respect to the said surface as well as to said finder, means on the rear of the camera for adjusting the lens by the carriage within the said focal range, means for changing the focal alignment of the lens in focused condition between the said surface and finder, and calibrations in operative relation to said adjusting and changing means to indicate the distance of the focus for various lenses.

In testimony that I claim the foregoing as my invention I have signed my name.

ARMIN FRIED.